3,053,531
SHEET HANDLING APPARATUS
Evelyn Victor Green, 2221 31st St. S., and Paul R. Hines, 1534 14th St. S., both of St. Petersburg, Fla.
Filed Jan. 30, 1961, Ser. No. 85,820
2 Claims. (Cl. 271—53)

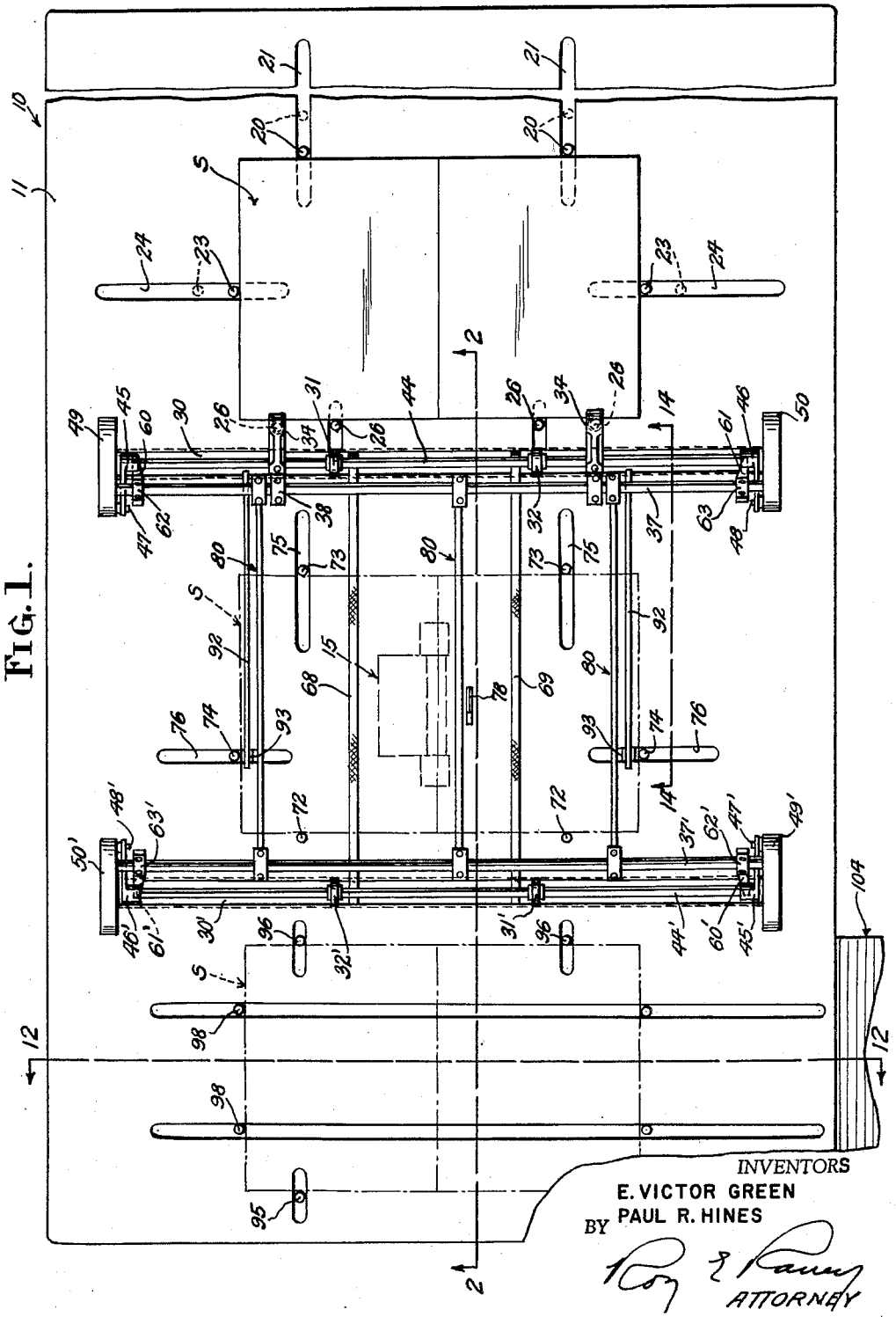

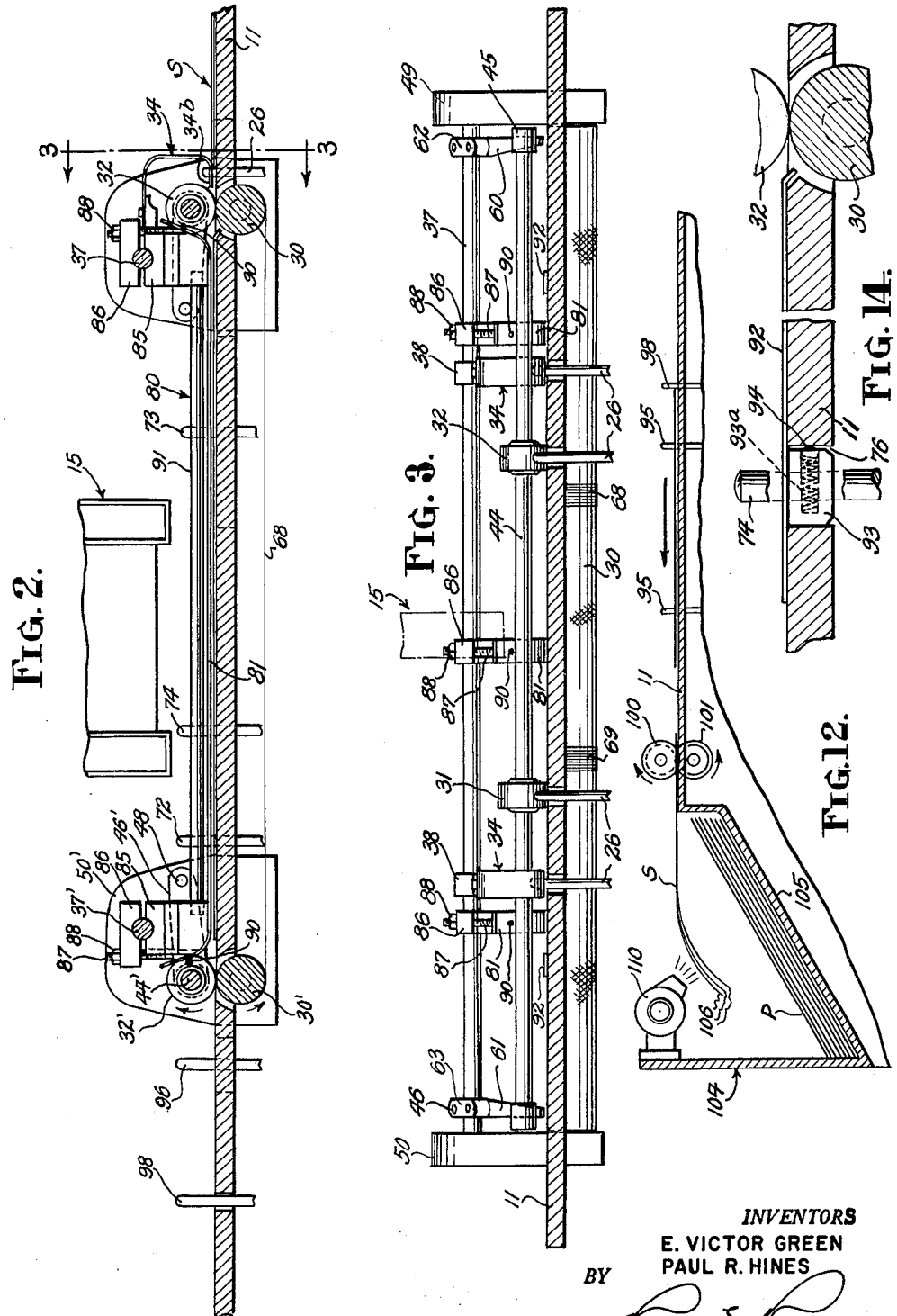

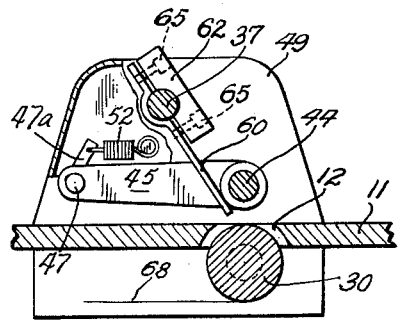
FIG. 6.
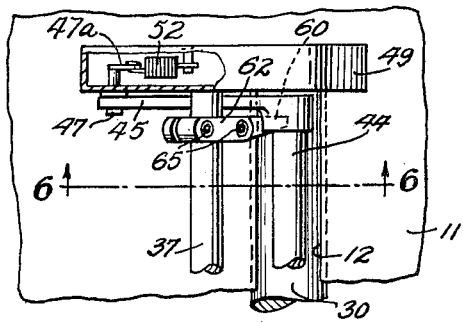
FIG. 4.
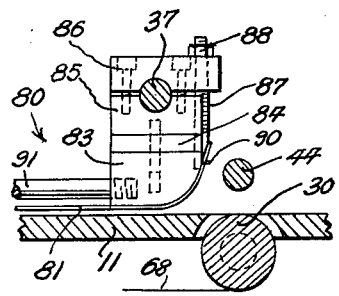
FIG. 7.
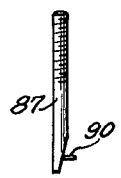
FIG. 10.
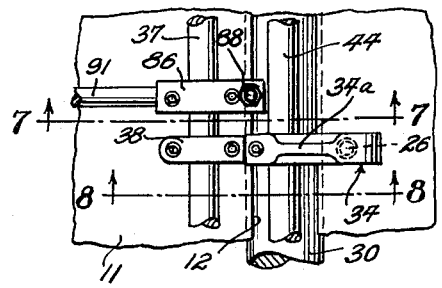
FIG. 5.
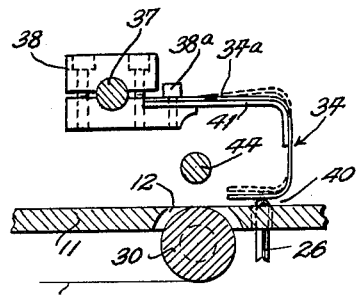
FIG. 8.
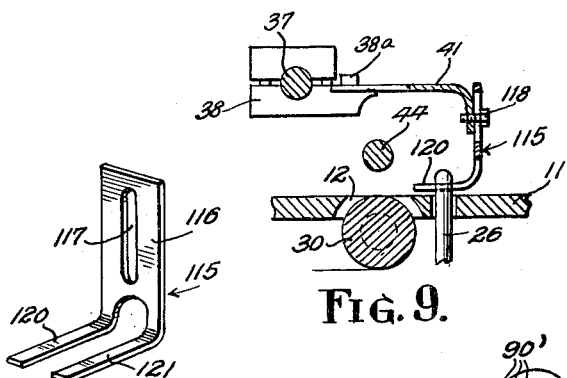
FIG. 9. FIG. 13. FIG. 11.
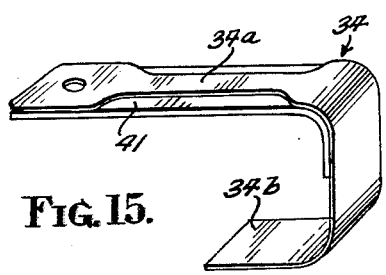
FIG. 15.
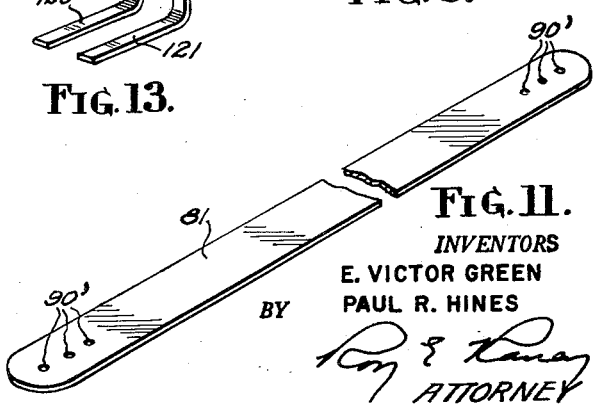
INVENTORS
E. VICTOR GREEN
PAUL R. HINES
BY
ATTORNEY United States Patent Office 3,053,531
Patented Sept. 11, 1962

This invention relates to sheet handling apparatus of that type having movable fingers or gauges and feed roll means for aligning and moving webs or sheets across a table or surface so as to pass through a work station where a work step, such as stapling, printing or embossing, is carried out, and the invention is more specifically directed to improvements in guiding, aligning, and feeding means in such apparatus.

While the present invention may have utility in various sheet or web handling machines, it is particularly suited for a machine for stapling a number of newsprint sheets together in the form of a booklet, and provides improvements in mechanically feeding the newsprint sheets in loose leaf booket form to a stapling station in a smooth and flat position and in accurate alignment with the stapler. The sheets are fed to the stapler by power mechanism which first "squares" or properly aligns the sheets relative to a set of feed rolls which accelerates and passes the sheets along a flat table surface to a stapling station in which the sheets are held flat against the table by bands and are moved to guide stops to be held for stapling and then, after the stapling operation, the sheets are discharegd into a stack.

In applying our invention to a stapling machine, for example, having a table along which sheets are moved by fingers or the like against stop means or gauges for aligning the leading edges of the sheets parallel to feed rolls, and after which the stop means are lowered below the table surface to permit passage of the sheets between the rolls, hold down or arrestor means are provided for cooperation with the stop means for maintaining the leading edges of the sheets against the stop means when the latter are raised and project above the surface of the table, the hold down means comprising depending members each having a foot portion extending parallel and in spaced relation to the table surface to permit passage of the sheets therebeneath when the stop means are lowered, and which foot portions preferably each comprise a spring strip which is engaged and flexed by one of the stop members when the latter are raised to their stopping positions, the flexing of the foot portions insuring positive contact with the stop members beyond which the foot portions over-hang and act to maintain the leading edges of the sheets in proper relation against the stop members.

Another object of the present invention is the provision of improved feed roll means which are adapted to grip and advance sheets therethrough without likelihood of introducing skewing or effecting uneven advancement of the sheets, the feed roll means including spaced upper and lower rollers resiliently biased toward one another for gripping sheets therebetween to advance the sheets across the table, and wherein adjustable stop means are provided at one or both ends of the roll means to adjust the spacing between the upper and lower rollers of the feed rolls so that the sheet gripping action at both ends of the roll means can be readily equalized to assure uniform and straight feeding of the sheets.

Still another object of this invention is the provision of improved sheet transition hold down means effective to prevent wrinkling, buckling, and curling of sheets during transfer, alignment and/or processing between two successive feed roll means, the transition hold down means including narrow flat bands, preferably of steel, aligned with the direction of sheet travel across the table surface and spaced from that surface in close parallel relation thereto, the bands being supported at opposite ends and held under tension so as to rigidly resist deflection, the tension being maintained by compression rods extendsing parallel to the bands. Preferably, the rods are supported above the table on which the sheets are moved by bracket means attached to horizontal bars and having adjustable spacing means between the portions atttached to the bars and the portions to which the ends of the bands are attached so that the space between the table surface and the bands can be changed to accommodate various thicknesses of sheets passing beneath the bands.

Yet another object of the present invention is the provision of means for directing a flow of air against the top surface of sheets, or groups of sheets stapled together, as they are transferred from one table surface to a lower surface for stacking, the flow of air being utilized to counteract the trapping of air between sheets of each group as it passes from the higher surface to the stack on the lower surface, thereby preventing trapped air from causing buckling, curling, and folding over of the sheets.

The invention resides in other constructions and arrangements of parts, the objects and advantages of which will become apparent from the following detailed description of a presently preferred embodiment of the invention, and from the accompanying sheets of drawings forming a part of this specification, and in which:

FIG. 1 is a top plan view of apparatus embodying the present invention;

FIG. 2 is a sectional view of the apparatus of FIG. 1 taken along line 2—2 thereof;

FIG. 3 is a sectional view of the apparatus taken substantially along line 3—3 of FIG. 2;

FIG. 4 is a fragmentary view on an enlarged scale of a feed roll adjusting portion of the apparatus;

FIG. 5 is a plan view upon an enlarged scale of a portion of the apparatus;

FIG. 6 is a sectional view taken along line 6—6 of FIG. 4;

FIG. 7 is a sectional view taken along line 7—7 of FIG. 5;

FIG. 8 is a sectional view taken along line 8—8 of FIG. 5;

FIG. 9 is a fragmentary view of a modified form of the apparatus;

FIG. 10 is a view on an enlarged scale of a draw-bolt forming a part of the apparatus;

Fig. 11 is a perspective view of a transition band forming a part of the apparatus;

FIG. 12 is a fragmentary sectional view taken along line 12—12 of FIG. 1;

FIG. 13 is a perspective view of a portion of the modification of FIG. 9;

FIG. 14 is a fragmentary sectional view taken along line 14—14 of FIG. 1; and

FIG. 15 is a perspective view on an enlarged scale of a portion of the apparatus of FIG. 1.

The present invention is particularly concerned with the guiding and alignment of sheets or webs as they are passed or moved by sheet handling apparatus along a table top or like surface through one or more work or processing stations, and the invention will be described hereinafter as being embodied in such sheet handling apparatus in which, by way of example, sheets or webs are moved through a work station comprising stapling or stitching apparatus. It will be understood, however, that other processes might be carried out, such as printing or embossing, as the webs are moved by the apparatus.

In the form of the invention illustrated in the drawings and described hereinafter, there is provided a sheet or web handling apparatus generally indicated at 10, which comprises a table 11, across the surface of which stacks of webs or sheets of newsprint S are automatically passed to and from a stapling or stitching mechanism 15, which forms booklets of the stacked sheets. The sheets S are aligned and advanced across the surface of the table 11 from right to left as viewed in FIG. 1 by movable fingers or gauges and by feed roll means, described more fully hereinafter, for processing.

Although the invention may be embodied in other similar apparatus or machines having movable fingers or gauges and feed roll means for handling sheets, one example of such machine is disclosed in United States Patent No. 2,747,189, issued May 29, 1956.

The various parts of the apparatus with which the invention is concerned will be described in connection with their operation on a pile of sheets S after the pile is deposited on the surface of table 11 adjacent the right hand end thereof and in approximately the full line position shown in FIGS. 1 and 2. When sheets S are so placed, a pair of fingers or back gauges 20, which project above the surface of table 11 and are reciprocable in slots 21 therein, are located in their dotted line positions. Likewise, a pair of fingers or side gauges 23, which project above the surface of table 11 and are reciprocable in slots 24 therein, are in their dotted line positions. The back gauges 20 then move to their solid line positions moving the sheets S and bringing the leading edges thereof into engagement with front gauges or stop members 26 which project above the surface of table 11 through slots 27. At the same time side gauges 23 move towards one another into their full line positions whereby sheets S are centered with respect to table 11 and the leading edges are accurately positioned parallel to the axes of feed roll means comprising, in this instance, a lower feed roll 30 and a pair of axially spaced upper rolls 31 and 32. The front gauges or stop members 26 are then retracted below the surface of table 11 in their respective slots 27, and thereafter the back gauges 20 advance the aligned and centered sheets S into the feed roll means.

It is essential that the sheets be accurately positioned against the front gauges or stop members 26 with the leading edges parallel to the feed roll means so that the sheets may be fed and passed therebetween in a straight path without "skewing" or twisting, a condition which results in improperly placed staples and often results in a jam-up of sheets in subsequent stages of travel through the apparatus. To accomplish this alignment or positioning of the sheets, the front gauges or stop members 26 and the back and side gauges 20 and 23, are in the form of pins moved and operated in timed relation to one another, by mechanism, not shown, housed below the table 11. The pins or stop members 26 are reciprocated between positions above and below the surface of the table to first permit alignment of the sheets S thereagainst by the pins or back gauges 20, and then to release the sheets for movement by the back gauges into the feed rolls. The pin operating mechanisms housed below table 11 do not form part of the present invention and it will be understood that they may be any of those well known in the art to which this invention pertains such as disclosed in the above mentioned United States Patent No. 2,747,189.

To prevent the leading edges of the sheets S from "climbing" over stop members 26 and causing misalignment of the sheets, depending, U-shaped arrester members 34, preferably formed from flat spring stock, are secured by one leg portion 34a thereof to a transverse bar 37 by means of clamps 38, as is best shown in FIGS. 5 and 8. Each arrester member has a movable foot portion 34b extending parallel and in spaced relation to the table surface and is positioned so as to be engaged and moved or lifted by one of the retractable pins or front gauges 26 when the latter are raised for aligning the leading edges of the sheets. The leg portions 34a of the arrestor members 34 are reduced in width, as shown, so that most of the flexing occurs in the reduced area upon engagement and lifting of the foot portions 34b by the pins or gauges 26. It will be recognized that as the front gauges 26 rise above the surface of table 11 and lift the foot portions 34b of the arrestors 34, a positive barrier is completed for the leading edges of sheets S preventing the possibility of the leading edges climbing over the front gauges and thereafter entering the feed roll means out of alignment.

Foot portions 34b overlie the surface of table 11 a short distance ahead of gauges 26 thereby providing confined spaces 40 which minimize curling of the leading edges of the sheets against the front gauges. The U-shaped arrestors 34 are preferably removably secured to clamps 38 by means of screws 38a and are prevented from being set into vibrating motion under the influence of the reciprocation of the front gauges 26 by L-shaped rigid members 41 which underlie the leg portions 34a and are also secured to the clamps 38 by screws 38a. The spacing between foot portions 34b and the surface of table 11, when the front gauges are retracted below that surface, is such as to permit unrestricted movement of the aligned sheets S therebetween under the pushing influence of the back gauges 20 for advancement into the feed roll means.

In some instances the front gauges 26 are each displaced a short distance opposite the direction of travel of the sheets S before retraction of the gauges on every other stroke thereof, so that every other booklet will have its staples "staggered" slightly with respect to the rest of the booklets to thereby permit more even stacking of the completed booklets. It will be recognized that the inherent flexibility of the arrestor members 34 will permit this displacement of the gauges 26 while the foot portion 34b is engaged thereby without impairing its complete barrier to the leading edges of the sheets S during such "stagger stitching."

The lower feed roller 30, which is preferably scored or knurled and is partially exposed by an opening 12 in table 11, is rotated by drive means forming a part of the mechanism earlier referred to as being housed under table 11 and, roller 30 is rotated at a rate which substantially accelerates the sheets S which are fed thereto by the back gauges or pushers 20. The upper rollers 31 and 32, which are preferably of rubber or the like, are fixed to a rotatable shaft 44, the ends of which are journaled in the free ends of swing arms 45 and 46. The latter are pivoted by pivot member 47 and 48 to support members 49 and 50 respectively, which project upwardly from the surface of table 11. The swing arms 45 and 46 are resiliently biased about their pivotal connections by springs 52 acting on the upturned inner ends of pivot members 47 and 48, one of which is shown in FIGS. 4 and 6, so as to urge shaft 44 and rollers 31 and 32 toward the lower roller 30. In some instances the springs 52 may be omitted and the weight of shaft 44 and rollers 31 and 32 relied upon to bias the latter toward the roller 30. Inasmuch as the feed roll means accelerate the movement of the sheets S, gripping of the sheets by one of the upper feed rollers 31, 32 ahead of the other would effect a skewing of the sheets leading to probable buckling, creasing, and jamming of the sheets in the apparatus in later stages of the transfer therethrough. In order to preserve the alignment of the sheets S as they are gripped by the feed roll means and accelerated to a relatively high speed, it is necessary to equalize the gripping engagement of the leading edges of the sheets by the spaced rollers 31 and 32 so that they grip the sheets at substantially the same instant. It has been found that equalization or synchronization of the gripping of the sheets between the upper and lower rollers can best be regulated by preventing the upper rollers 31 and 32 from actually coming into contact with the lower roller 30, a space being maintained therebetween which is just slightly less than the thickness of the sheets or groups of sheets to be fed therethrough. By so doing, the effects of variations in the spring means urging the opposite ends of shaft 44 toward the roller 30, differences in the diameters of the rollers 31 and 32, and differences in the resiliency of these rollers, are substantially eliminated from those factors which affect the equalization of the gripping action of the feed roll means at both ends thereof. The shaft 44, and hence the rollers 30 and 32, is limited in its movement toward roller 30 by a pair of stop arms 60 and 61 which are secured to shaft 37 adjacent to the opposite ends thereof by clamping members 62 and 63 respectively. The arms 60 and 61 underlie bearing bosses on the free ends of swing arms 45 and 46 supporting the opposite ends of shaft 44, and are independently adjustable in their positions with respect to shaft 37 by loosening and tightening screws 65, so that the upper rollers 31 and 32 can be accurately spaced with respect to the lower roller 30.

In the present apparatus embodying the invention, the sheets are propelled by the feed roll means just described into the work station beneath the stapling mechanism 15, and toward a second feed roll means, which is substantially the same as that just described and the corresponding parts of which are denoted by corresponding reference numerals having primes affixed thereto. A pair of endless tapes or belts 68 and 69 extend about the shafts or rollers 30 and 31 and serve to aid in propelling the sheets S between the sets of feed roll means. As the sheets travel from the first feed roll means they are halted with their leading edges against a pair of retractable front gauges 72 and are aligned and centered respectively by back gauges 73 and side gauges 74 which are operated in their respective slots 75 and 76 to orient the sheets S beneath the stapling mechanism 15 and serves to actuate a switch which would prevent the stapling mechanism 15 from being actuated in the absence of sheets to be stapled.

The sheets S are guided in their transition or travel between the feed roll means through the work or processing station by a plurality of transition hold down means, generally indicated at 80, which provide a ceiling for the sheets S and serve to prevent the edges thereof from jumping or curling against the front gauges 72, the back gauges 73, and the side gauges 74. The hold down means 80, which are best illustrated in FIGS. 2, 5 and 7, each comprise a narrow flexible band 81, preferably of steel, extending in the direction of travel of the sheets S and disposed parallel to the surface of the table 11 at a predetermined distance therefrom. The bands 81 are supported at their opposite ends by bracket means clamped to the shafts 37 and 37', each bracket comprising a radius member 83, a spacer member 84 a pair of shaft clamping members 85 and 86, and a draw bolt 87 extending through clamp member 86 and held by a nut 88. The draw bolts 87, best illustrated in FIG. 10, comprise a pin 90 extending from one end thereof for engaging one of a series of openings 90' in the ends of steel band 81. A compression rod 91 has each of its opposite ends engaged in a radius member 83 and the ends of the steel band 81 are drawn around the curved portions of the radius members by draw bolts 87 which are tightly drawn up by nuts 88 thereby placing the band under tension. The tension in band 81 is resisted by the compression rod 91 and is of a degree sufficient to prevent deflection of band 81 which is therefore maintained in parallel relationship with the surface of table 11. The bands 81 may be spaced a predetermined distance from table 11 by selection of spacer members 84 which will provide the desired spacing. The hold down means 80 just described, provide a particularly rugged and effective guide means for the sheets S as they pass through the work station, and which are not readily subject to displacement from their proper locations by a jam-up of sheets thereunder, nor by forces often imposed thereon during the hasty removal of such jammed sheets.

Referring to FIG. 14, there is illustrated therein one of a pair of hold up strips 92 extending from the opening 12 in table 11 across the slots 76 in which the side guides or gauges 74 operate. The hold up strips 92 serving to prevent the likelihood of downwardly curled corners or edges of the sheets S from catching in the slots 76 and causing a jam-up. Strips 92 are preferably formed of flat spring steel and are each retained in position by a block 93 received in the respective slot 76. A spring biased detent 94 projects from a bore 93a in block 93 and acts against the adjacent wall of slot 76 to force the block against the opposite wall of the slot so as to maintain the strip in its proper position. The detent 94 is biased with sufficient pressure to securely hold the strip 92 in position against displacement by the removal or clearing of a jam-up of sheets as sometimes occurs under the stitching mechanism 15.

After the sheets S have been stapled into an open booklet or group by the mechanism 15, the stops or front gauges 72 retract and the sheets S are advanced by the back gauges 73, and by the belts 68 and 69, into the grip of feed roll means including rollers 31', 32' and 30'. The latter propel the sheets S against stop members 95 where they are again aligned with respect to the table by retractable gauges 96. Upon being so aligned the sheets are fed by pusher members or fingers 98 transversely of their previous direction of travel for removal from the table 11.

In the present instance, a further processing operation is performed on the stapled sheets S as they are removed from the table propelled by fingers 98 in the direction indicated in FIG. 12, that further step or process comprising trimming of one edge of the sheets by a pair of driven shear wheels 100 and 101. As the shear wheels 100 and 101 trim the former leading edge of the sheets S, the sheets are moved from the surface of table 11 for collection in a stacking box or chute 104 which has a sloping bottom wall 105 at a level substantially below that of table 11. Because the sheets S are propelled rapidly through the air from shears 100, 101 into box 104 the leading edges 106 thereof tend to be separated and, in the case of flimsy material to curl under and double back as they land on the pile P. To counteract the action of air separating the sheets 106, the apparatus of the present invention includes a means in the form of a centrifugal blower 110 for directing a flow of air against the upper surface of the sheets S as they travel from the surface of table 11 to the pile P in box 104.

Referring now to FIGS. 9 and 13 there is shown therein an alternative form of arrester means for use in cooperation with the front gauges 26 instead of the spring means 34 for providing the positive barrier to the leading edges of the sheets S. The arrester means shown in these figures comprises an L-shaped fork member 115 including an upright leg portion 116 having an elongated slot 117 therein for receiving a screw 118 by which the member is adjustably secured to the L-shaped member 41, which is in turn secured by clamping means 38 to shaft 37 in the manner previously described. Member 115 includes a pair of spaced legs 120 and 121 which extend in parallel spaced relation to table 11, and between which the front gauge 26 is adapted to extend when in its sheet stopping position as illustrated in FIG. 9. The legs 120 and 121 thereby cooperate with the front gauge 26 to provide a positive barrier for the leading edges of sheets S while permitting unrestricted passage of the sheets thereunder when the front gauge 26 is retracted.

From the foregoing detailed description of sheet handling apparatus embodying the present invention, it will be appreciated that there have been provided thereby particularly effective and rugged means for assuring the proper alignment of sheets fed by the apparatus, whereby sheets may be fed rapidly through a processing station without likelihood of spoilage by misalignment or jamming of the apparatus. It will also be appreciated that improved control of the passage of the sheets through the apparatus is afforded by the positive barrier effected by the arrester means, the synchronized gripping of the leading edges of the sheets by the spaced rollers of the feed roll means, the improved hold down means between the feed roll means, and the means for directing a flow of air on the surface of the sheets as they are removed from the apparatus and stacked in a receiving box, and that because of the improved control the likelihood of spoilage of sheets and jamming of the apparatus is substantially reduced and the output or production of the apparatus correspondingly increased.

Although the invention has been described with detailed reference to a specific sheet handling apparatus embodying the invention, it will be understood that the invention is not limited thereto, but rather the invention includes all those modifications, adaptations, and uses which are reasonably embraced by the scope of the claims hereof.

Having described our invention, we claim:

1. In apparatus of the character described having first and second feed roll means for propelling sheets across a surface extending therebetween, hold down means for guiding said sheets along said surface between said feed roll means, said hold downm eans comprising a narrow band extending in the direction of travel of the sheets, means supporting said band by the opposite ends thereof and in spaced relation to said surface, said last mentioned means comprising means for holding said band under tension, said means supporting said band comprising first and second curved members, clamping means securing said curved members to first and second bars extending transverse to said direction of travel, spacer means between said curved members and said clamping means for determining said spaced relation, a compression rod extending between said curved members, and draw bolts extending through said clamping means and drawing the ends of said band around said curved members so that the tension in said band is opposed by said compression rod.

2. In a sheet handling apparatus of the character described having means for pushing sheets across the surface thereof, retractable stop members projectable above said surface for engagement by the leading edges of said sheets, and arrestor means cooperable with said stop members for providing a positive barrier for said leading edges, said arrestor means comprising a fixed shaft extending in parallel spaced relation to said surface and transverse to the path of travel of said sheets, a U-shaped spring member having upper and lower horizontal flexible leg portions extending parallel to said surface, clamping means securing the end of one of said leg portions to said fixed shaft, the other of said leg portions being in the form of a foot disposed in spaced parallel relation to said surface and overlying said retractable stop member, said one leg portion having a section of reduced size which is more easily flexed than the remainder of said spring member, said stop member being adapted to engage said foot and to flex said spring member at said reduced section when projecting above said surface to form said barrier, and a rigid backing member extending horizontally from said clamping means and underlying said reduced section of said one leg portion of said spring member, said backing member serving to limit flexing movement of said spring member toward said surface so that when said stop member is below said surface said foot is disposed in predetermined spaced relation to said surface for confining said sheets to said surface during movement over said stop member.

References Cited in the file of this patent
UNITED STATES PATENTS

| | | |
|---|---|---|
| 423,661 | Brooks | Mar. 18, 1890 |
| 1,024,186 | Dick | Apr. 23, 1912 |
| 1,046,190 | Huddleston | Dec. 3, 1912 |
| 1,424,260 | Richards | Aug. 1, 1922 |
| 2,699,331 | McGarvey et al. | Jan. 11, 1955 |
| 2,747,189 | Fenimore | May 29, 1956 |
| 2,769,495 | Pomper et al. | Nov. 6, 1956 |
| 2,936,170 | Herrick et al. | May 10, 1960 |
| 3,015,485 | Smith | Jan. 2, 1962 |